(12) United States Patent
Roh et al.

(10) Patent No.: US 12,482,872 B2
(45) Date of Patent: Nov. 25, 2025

(54) BATTERY MODULE AND BATTERY PACK INCLUDING THE SAME

(71) Applicant: LG Energy Solution, Ltd., Seoul (KR)

(72) Inventors: Taehwan Roh, Daejeon (KR); Jong Cheol Lee, Daejeon (KR); Chang Hyun Sung, Daejeon (KR); Geunhoe Huh, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 906 days.

(21) Appl. No.: 17/614,894

(22) PCT Filed: Jul. 15, 2020

(86) PCT No.: PCT/KR2020/009286
§ 371 (c)(1),
(2) Date: Nov. 29, 2021

(87) PCT Pub. No.: WO2021/096023
PCT Pub. Date: May 20, 2021

(65) Prior Publication Data
US 2022/0238934 A1    Jul. 28, 2022

(30) Foreign Application Priority Data
Nov. 13, 2019    (KR) .................. 10-2019-0145144

(51) Int. Cl.
*H01M 10/615*    (2014.01)
*H01M 10/48*    (2006.01)
(Continued)

(52) U.S. Cl.
CPC ....... *H01M 10/615* (2015.04); *H01M 10/486* (2013.01); *H01M 10/63* (2015.04); *H01M 10/653* (2015.04); *H01M 10/6571* (2015.04)

(58) Field of Classification Search
CPC .. H01M 10/615; H01M 10/486; H01M 10/63; H01M 10/653; H01M 10/6571;
(Continued)

(56) References Cited

U.S. PATENT DOCUMENTS

| 6,087,036 A | 7/2000 | Rouillard et al. |
| 9,207,764 B2 | 12/2015 | Birnbaum et al. |

(Continued)

FOREIGN PATENT DOCUMENTS

| CN | 101330146 A | * 12/2008 | ............. H01M 4/86 |
| CN | 103151574 A | 6/2013 | |

(Continued)

OTHER PUBLICATIONS

International Search Report for PCT/KR2020/009286 dated Oct. 29, 2020. 4 pgs.
(Continued)

*Primary Examiner* — Kaity V Chandler
(74) *Attorney, Agent, or Firm* — Lerner David LLP (57) ABSTRACT

The battery module according to one embodiment of the present disclosure includes a battery cell stack in which a plurality of battery cells are stacked; and a sensing assembly located on the battery cell stack. The sensing assembly includes a main body located on the battery cell stack and a module connector connected to the main body. The main body is a flexible printed circuit (FPC) or a flexible flat cable (FFC), and the main body includes a heating wire circuit.

20 Claims, 9 Drawing Sheets

(51) Int. Cl.
    *H01M 10/63*     (2014.01)
    *H01M 10/653*     (2014.01)
    *H01M 10/6571*     (2014.01)

(58) Field of Classification Search
    CPC ............ H01M 10/617; H01M 50/204; H01M 2220/20; H01M 10/48; H01M 50/249; H01M 10/635; H01M 50/258; H01M 50/289; H01M 50/298; H01M 50/503; H01M 50/505; H01M 50/519; H01M 10/657; H01M 10/425; H01M 10/623; H01M 10/625; H01M 2220/30; H01M 50/20; Y02E 60/10; Y02T 10/70
    See application file for complete search history.

(56) References Cited

U.S. PATENT DOCUMENTS

| | | | |
|---|---|---|---|
| 9,778,744 B2 | 10/2017 | Birnbaum et al. | |
| 10,209,776 B2 | 2/2019 | Birnbaum et al. | |
| 2015/0108113 A1 | 4/2015 | Hioki et al. | |
| 2016/0093931 A1 | 3/2016 | Rawlinson et al. | |
| 2016/0268652 A1 | 9/2016 | Eom et al. | |
| 2017/0325364 A1 | 11/2017 | Jung et al. | |
| 2018/0062223 A1 | 3/2018 | Murata et al. | |
| 2018/0145520 A1 | 5/2018 | Sasaki et al. | |
| 2019/0097205 A1 | 3/2019 | Xiao et al. | |
| 2019/0220094 A1 | 7/2019 | Birnbaum et al. | |
| 2019/0288323 A1* | 9/2019 | Dawley | H01M 10/637 |
| 2019/0288355 A1 | 9/2019 | An et al. | |
| 2019/0348720 A1 | 11/2019 | Oh et al. | |
| 2019/0389318 A1 | 12/2019 | Lee et al. | |
| 2020/0014005 A1 | 1/2020 | Lee et al. | |
| 2020/0295325 A1 | 9/2020 | Tyler et al. | |

FOREIGN PATENT DOCUMENTS

| | | | | |
|---|---|---|---|---|
| CN | 103390742 A | * | 11/2013 | ............ Y02E 60/10 |
| CN | 104285334 A | | 1/2015 | |
| CN | 205104554 U | | 3/2016 | |
| CN | 105576323 A | | 5/2016 | |
| CN | 105594055 A | * | 5/2016 | ......... G01R 31/3624 |
| CN | 106104862 A | * | 11/2016 | ............ H01M 4/625 |
| CN | 106384852 A | * | 2/2017 | .......... H01M 10/486 |
| CN | 106785234 A | | 5/2017 | |
| CN | 206349469 U | | 7/2017 | |
| CN | 206758614 U | * | 12/2017 | ............ Y02E 60/10 |
| CN | 107896513 A | | 4/2018 | |
| CN | 108292789 A | | 7/2018 | |
| CN | 108321463 A | | 7/2018 | |
| CN | 108598626 A | | 9/2018 | |
| CN | 208134020 U | | 11/2018 | |
| CN | 109059307 A | | 12/2018 | |
| CN | 110352513 A | | 10/2019 | |
| EP | 3550663 A1 | | 10/2019 | |
| JP | 2007213939 A | * | 8/2007 | ............ Y02E 60/10 |
| JP | 2007329047 A | | 12/2007 | |
| JP | 2008204990 A | * | 9/2008 | .......... B60L 11/1874 |
| JP | 1593772 B2 | | 12/2010 | |
| JP | 2015032475 A | | 2/2015 | |
| JP | 2015057759 A | | 3/2015 | |
| JP | 2017204358 A | | 11/2017 | |
| JP | 2019192486 A | | 10/2019 | |
| KR | 100570726 B1 | | 4/2006 | |
| KR | 20150062743 A | | 6/2015 | |
| KR | 20160054443 A | | 5/2016 | |
| KR | 101793720 B1 | | 11/2017 | |
| KR | 20180099438 A | | 9/2018 | |
| KR | 20190061378 A | | 6/2019 | |
| WO | 2014024477 A1 | | 2/2014 | |
| WO | 2018124494 A2 | | 7/2018 | |
| WO | WO-2019190108 A1 | * | 10/2019 | ............... B60K 1/04 |

OTHER PUBLICATIONS

Search Report dated Feb. 1, 2023 from the Office Action for Chinese Application No. 202080039355.5 issued Feb. 7, 2023, 4 pages. [See p. 2-3, categorizing the cited references].
Extended European Search Report for Application No. 20887328.1 dated Jul. 19, 2022. 8 pgs.

* cited by examiner

BATTERY MODULE AND BATTERY PACK INCLUDING THE SAME

CROSS-REFERENCE TO RELATED APPLICATIONS

This application is a national phase entry under 35 U.S.C. § 371 of International Application No. PCT/KR2020/009286 filed on Jul. 15, 2020, which claims priority from Korean Patent Application No. 10-2019-0145144 filed on Nov. 13, 2019, the disclosures of which are incorporated herein by reference in their entirety.

TECHNICAL FIELD

The present disclosure relates to a battery module and a battery pack including the same, and more particularly to a battery module having a heating member, and a battery pack including the same.

BACKGROUND ART

Secondary batteries have attracted much attention as an energy source in various products such as mobile devices and electric vehicles. The secondary battery is a potent energy resource that can replace the use of existing products using fossil fuels, and is in the spotlight as an environmentally-friendly energy source because it does not generate by-products due to energy use.

Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series/parallel.

Meanwhile, when a plurality of battery cells are connected in series/parallel to configure a battery pack, it is common to configure a battery module composed of at least one battery cell first, and then configure a battery pack by using at least one of the battery modules and adding other components.

Such a battery module includes a battery cell stack in which a plurality of battery cells are stacked, a busbar frame formed at each of both ends of the battery cell stack, and a sensing assembly that is located on the battery cell stack and measures the voltage and temperature of the battery cells.

Figure 1:
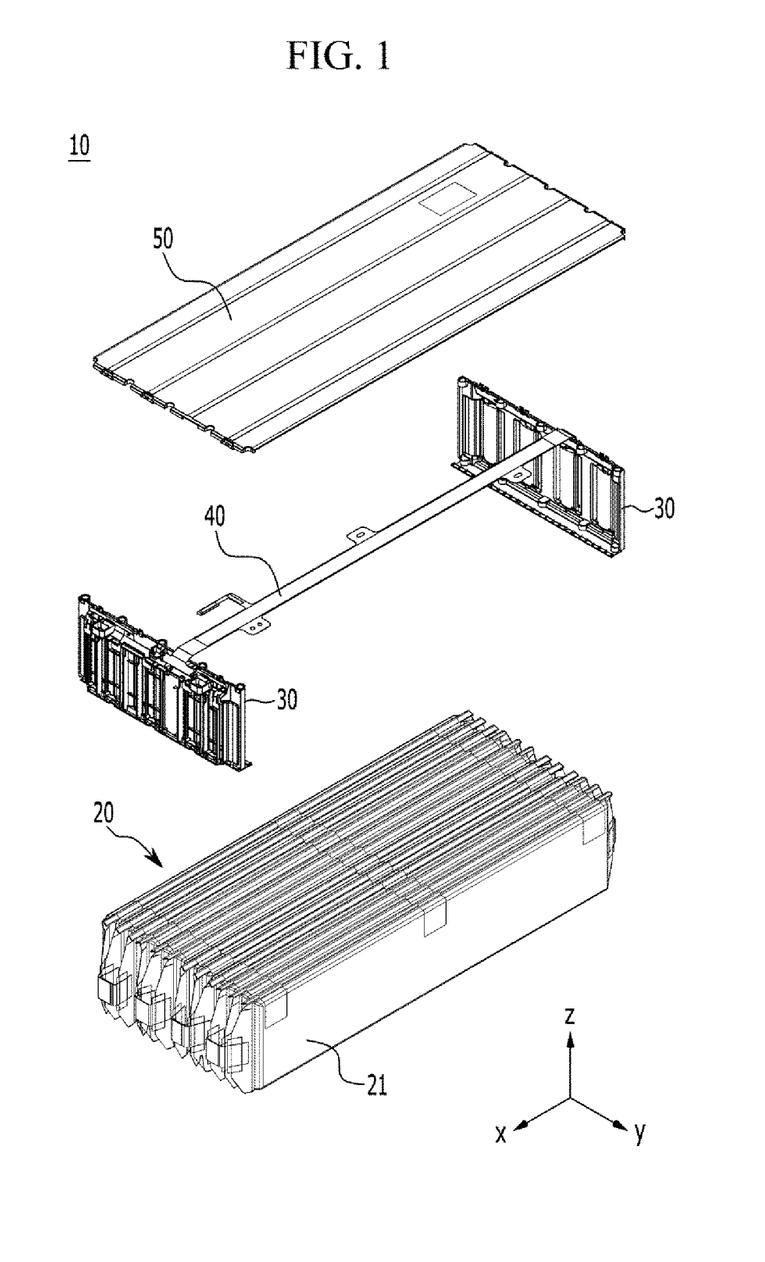
FIG. 1 is an exploded perspective view of a conventional battery module.

FIG. 1 is an exploded perspective view of a conventional battery module 10. Some configurations are omitted for convenience of description.

Referring to FIG. 1, the conventional battery module 10 may include a battery cell stack 20 in which a plurality of battery cells 21 are stacked, a busbar frame 30 formed at each of both ends (x-axis direction and opposite direction thereof) of the battery cell stack 20, and a sensing assembly 40 that is located on the battery cell stack 20 and measures the voltage and temperature of the battery cells 21.

The sensing assembly 40 may be formed of a flexible printed circuit (FPC) or a flexible flat cable (FFC).

Further, by installing a cover plate 50 on the upper end of the sensing assembly 40, an attempt was made to prevent damage to the sensing assembly 40 that may occur when housed in a mono frame (not shown).

Meanwhile, the battery cell 21, that is, a secondary battery, includes, for example, a nickel-cadmium battery, a nickel-hydrogen battery, a nickel-zinc battery, a lithium secondary battery, and the like. Among these, lithium secondary batteries are widely used in the field of advanced electronic devices because they have advantages over nickel-based secondary batteries, in that the memory effect hardly occurs and so charging and discharging are free, the self-discharge rate is very low, the operating voltage is high, and the energy density per unit weight is high.

However, the lithium secondary batteries have characteristics such that, due to the increase in resistance at low temperatures, charging and discharging are not performed smoothly, and the output and charging speed rapidly decrease. Consequently, the lithium secondary battery used in an electric driving device has a problem in that the efficiency and output of the secondary battery rapidly decreases when exposed to an external environment at a low temperature for a long time.

Further, as shown in FIG. 1, since a large number of battery cells 21 are compactly stacked to form a battery module 10, the battery cells 21 located at the outermost side are more affected by the external environment. The battery cells 21 located at the outermost side may have a relatively low temperature, which may deepen the temperature deviation between the battery cells 21 of the battery cell stack 20. The temperature non-uniformity between the battery cells 21 may cause a reduction in the life of the battery module 10 itself.

Therefore, efforts have been made to raise the temperature of the secondary battery in a low-temperature environment and reduce the temperature deviation between battery cells.

DETAILED DESCRIPTION OF THE INVENTION

Technical Problem

Embodiments of the present disclosure have been designed to solve the above-mentioned problems involved in the prior art methods and, therefore, it is an object of the present disclosure to quickly escape from the low temperature region by raising the temperature of the battery cells, and to minimize the temperature deviation between the battery cells by applying more heat to the battery cell located at the outermost side.

However, the problem to be solved by embodiments of the present disclosure is not limited to the above-described problems, and can be variously expanded within the scope of the technical idea included in the present disclosure.

Technical Solution

A battery module according to an embodiment of the present disclosure includes: a battery cell stack in which a plurality of battery cells are stacked; and a sensing assembly located on the battery cell stack, wherein the sensing assembly includes a main body located on the battery cell stack and a module connector connected to the main body, wherein the main body is a flexible printed circuit (FPC) or a flexible flat cable (FFC), and wherein the main body includes a heating wire circuit.

The main body may cover the entire upper surface of the battery cell stack.

The heating wire circuit may pass through an upper part of each of the plurality of battery cells.

The plurality of battery cells may be stacked along a direction parallel to the main body while standing vertically upright to the main body.

The interval between the heating wire circuits passing through the upper part of the battery cells located at the outermost side of the battery cell stack may be narrower than the interval between the heating wire circuits passing through the upper part of the other battery cells.

The heating wire circuit is configured in which a length of the portion passing through an upper part of the battery cell located at the outermost side of the battery cell stack may be longer than the length of the portion passing through an upper part of the other battery cell.

The interval between the heating wire circuits may become narrower as it is directed outward from the center of the battery cell stack.

The module connector may include a heating wire circuit input pin and a heating wire circuit output pin each connected to the heating wire circuit.

The main body may further include a voltage sensing circuit and a temperature sensing circuit.

The battery module may further include a thermal conductive resin layer located on a lower surface of the battery cell stack.

The battery module may further include a module frame that houses the battery cell stack, wherein the main body may be located between the upper surface of the battery cell stack and the module frame.

Advantageous Effects

According to the embodiments of the present disclosure, the temperature of the battery cells contained in the battery module can be effectively raised by using the heating wire circuit contained in the sensing assembly.

Further, more heat can be applied to the battery cell in which the heating wire circuit is located on the outermost side, and thus, the temperature deviation between battery cells can be minimized.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the figures, the size and thickness of each element are arbitrarily illustrated for convenience of description, and the present disclosure is not necessarily limited to those illustrated in the figures. In the figures, the thickness of layers, regions, etc. are exaggerated for clarity. In the figures, for convenience of description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a portion is referred to as "including" a certain component, it means that it can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

Figure 2:
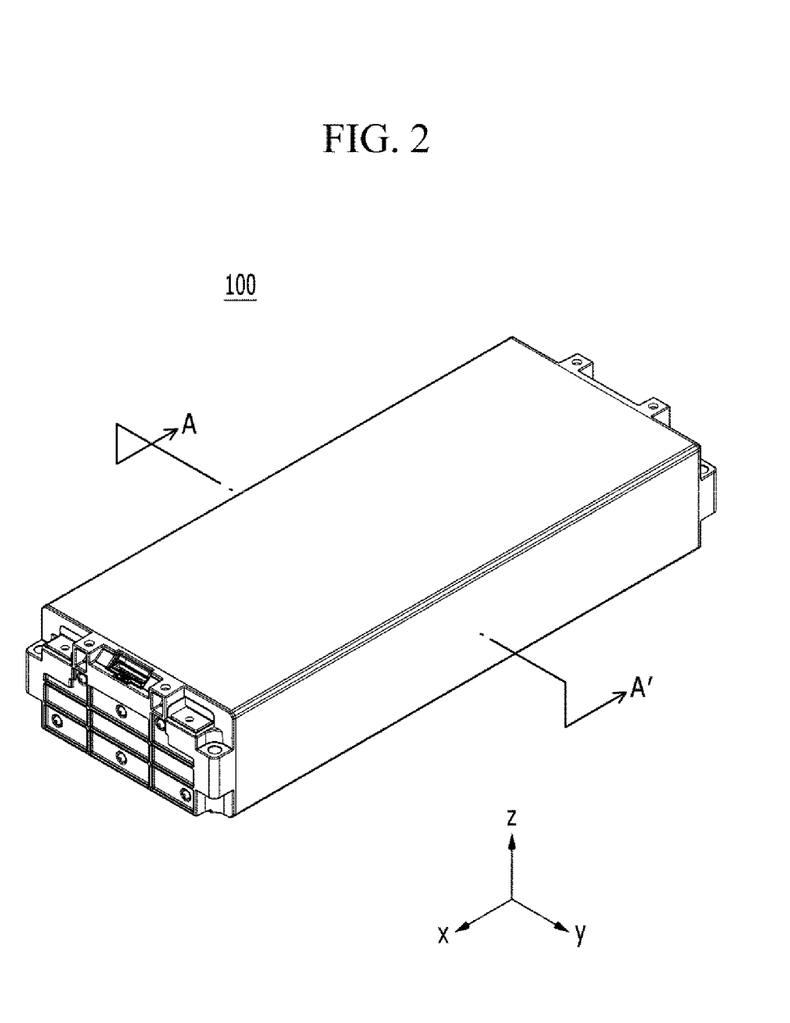
FIG. 2 is a perspective view of a battery module according to one embodiment of the present disclosure.
Figure 3:
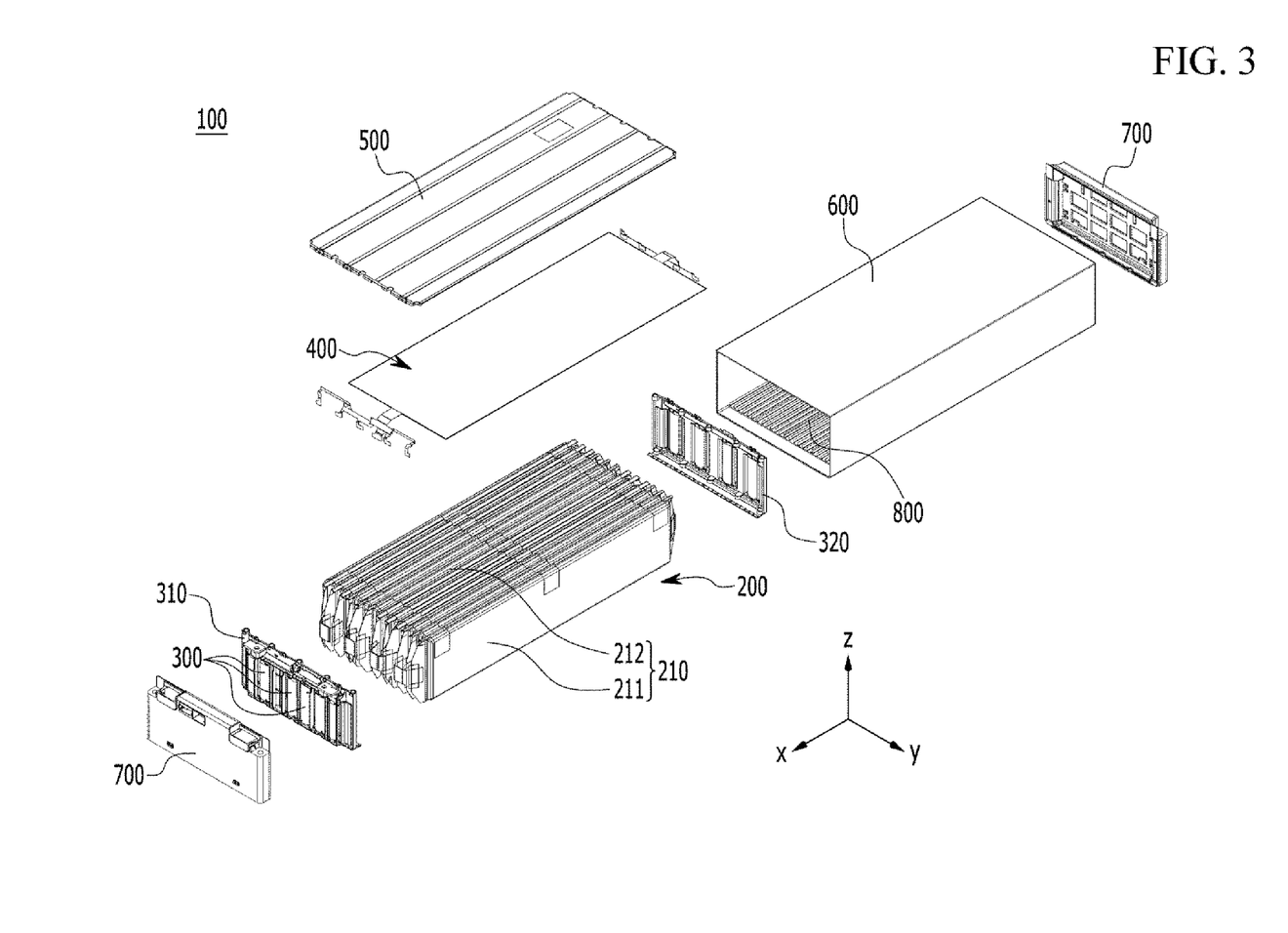
FIG. 3 is an exploded perspective view of the battery module of FIG. 2.
Figure 4:
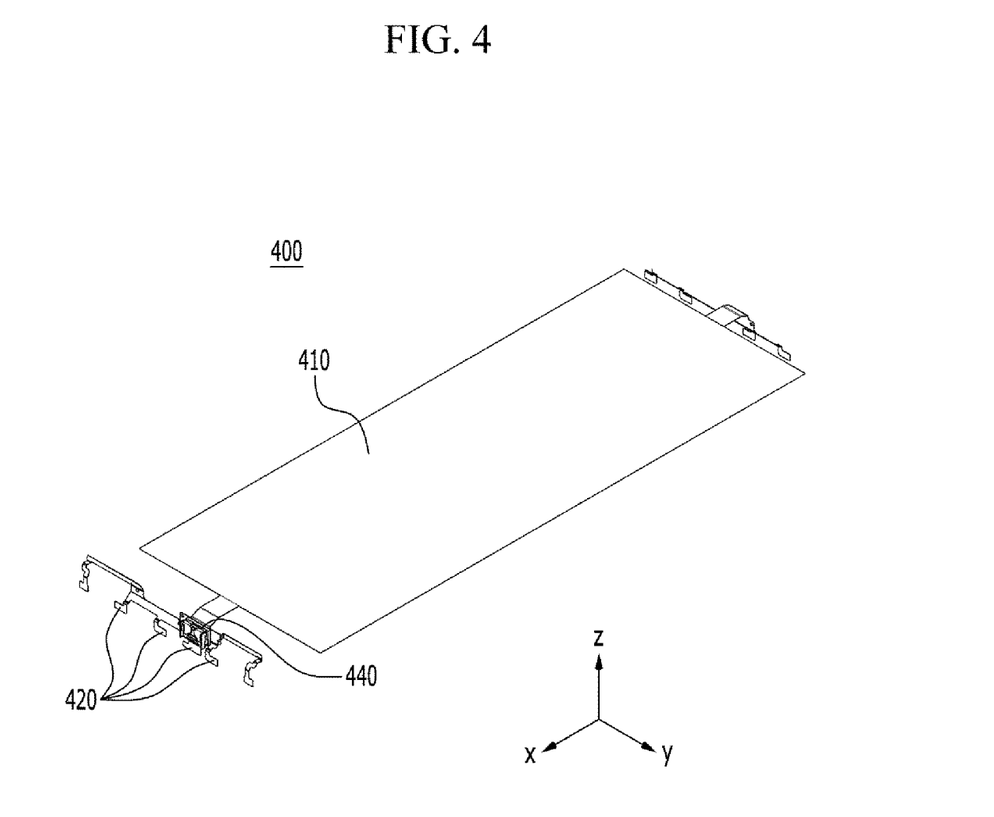
FIG. 4 is a perspective view showing a sensing assembly contained in the battery module of FIG. 3.

FIG. 2 is a perspective view of a battery module 100 according to one embodiment of the present disclosure, FIG. 3 is an exploded perspective view of the battery module 100 of FIG. 2, and FIG. 4 is a perspective view showing a sensing assembly 400 contained in the battery module 100 of FIG. 3.

Referring to FIGS. 2 to 4, the battery module 100 according to the present embodiment includes: a battery cell stack 200 in which a plurality of battery cells 210 are stacked; and a sensing assembly 400 located on the battery cell stack 200, wherein the sensing assembly 400 includes a main body 410 located on the battery cell stack 200 and a module connector 440 connected to the main body 410.

The main body 410 is a flexible printed circuit (FPC) or a flexible flat cable (FFC), and includes a heating wire circuit described later.

The main body 410 is a flexible printed circuit or a flexible flat cable, which attempts to detect a phenomenon such as overvoltage, overcurrent, and overheating of each battery cell 210 by sensing the voltage and temperature of the plurality of battery cells 210, and transmits electrical information to the BMS (Battery Management System) via the module connector 440. Thus, the main body 410 may include a voltage sensing circuit and a temperature sensing circuit.

Meanwhile, a first busbar frame 310 and a second busbar frame 320 may be formed on the front surface (x-axis direction) and the rear surface (direction opposite to the x-axis) of the battery cell stack 200, respectively. Respective busbar frames 310 and 320 are equipped with a busbar 300, and electrode leads of the battery cells 210 are connected to the busbar 300, so that the battery cells 210 may be electrically connected to each other. More specifically, after the electrode leads of the battery cells 210 pass through the slits formed in each of the busbar frames 310 and 320, they can be curved and joined to the busbar 300.

The battery cell stack 200 may be housed in a mono frame 600 having an opened front surface (x-axis direction) and an opened rear surface (direction opposite to the x-axis), and an end plate 700 may cover the opened front surface and the opened rear surface. The connection between the mono frame 600 and the end plate 700 is not particularly limited, but they may be weld-joined to each other.

Meanwhile, when the sensing assembly 400 and the battery cell stack 200 are housed in the mono frame 600, a cover plate 500 can be disposed on a sensing assembly 400 to prevent damage to the sensing assembly 400.

Figure 5:
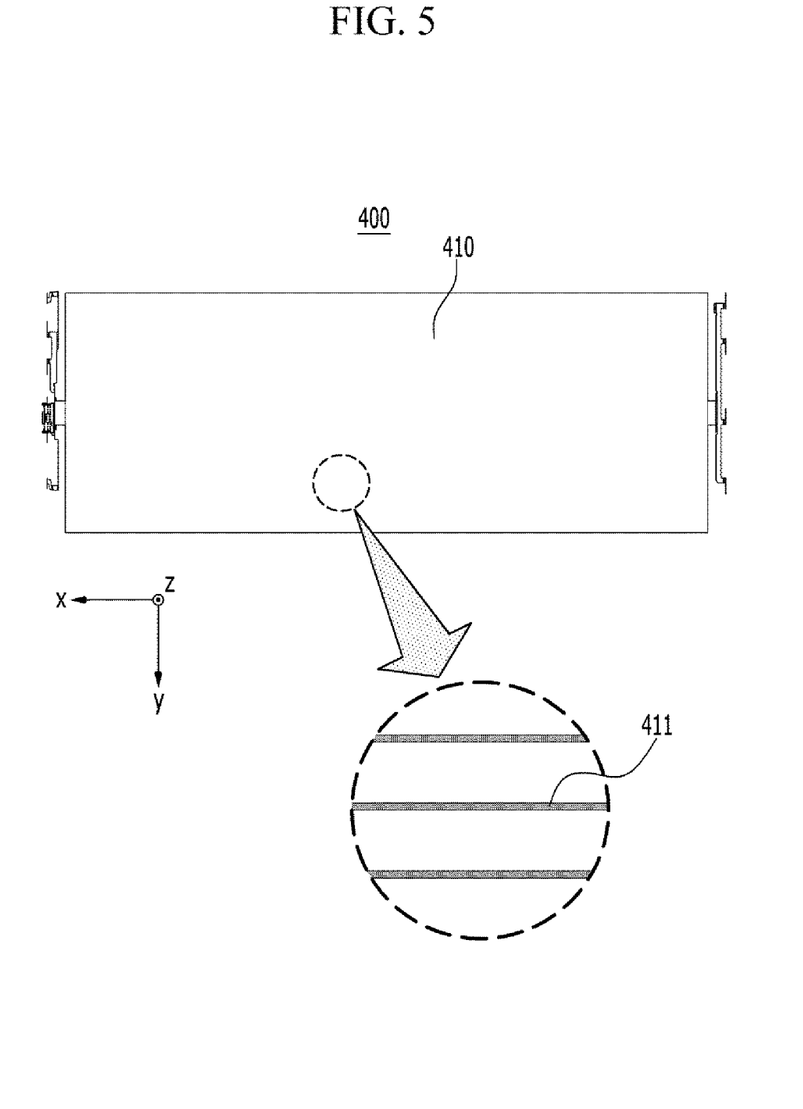
FIG. 5 is a plan view of the sensing assembly of FIG. 4 as viewed from above.
Figure 6:
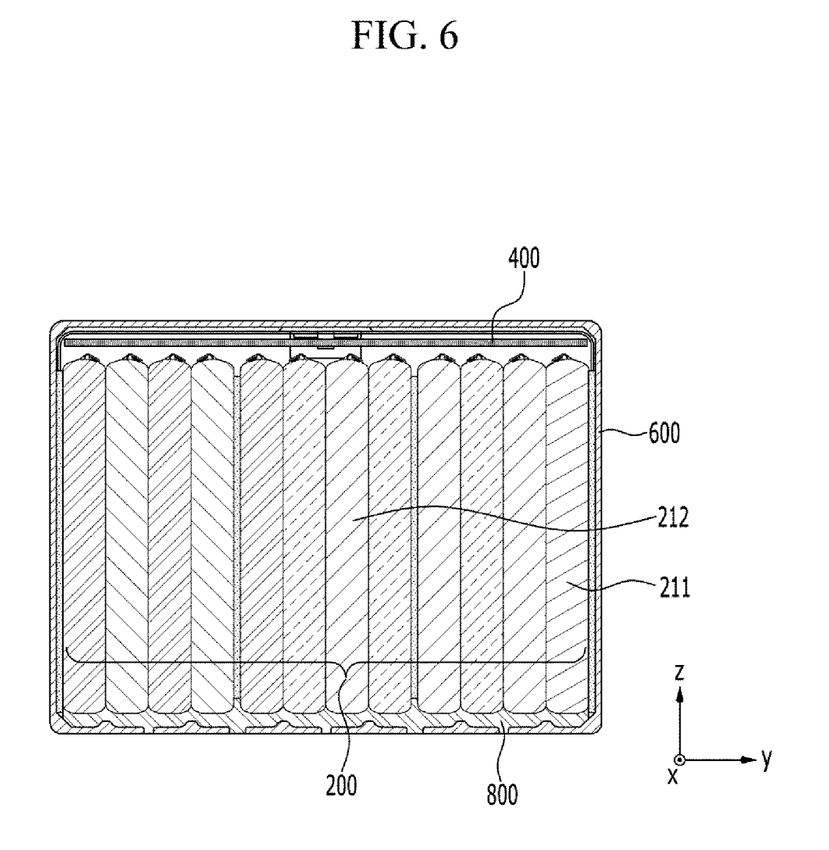
FIG. 6 is a cross-sectional view of the battery module of FIG. 2 taken along the cutting line A-A'.

FIG. 5 is a plan view of the sensing assembly 400 of FIG. 4 as viewed from above, and FIG. 6 is a cross-sectional view of the battery module 100 of FIG. 2 taken along the cutting line A-A'.

Referring to FIGS. 5 and 6, the main body 410 including a heating wire circuit 411 may cover the entire upper surface of the battery cell stack 200. Moreover, the heating wire circuit 411 may pass through the upper part of each of the plurality of battery cells constituting the battery cell stack 200. The heating wire circuit 411 may be a heating wire utilizing electric resistance.

When the temperature of the battery cells becomes low, there is a problem that the resistance increases and thus, charging and discharging are not performed smoothly, and the output and charging speed rapidly decrease. Therefore, in the present embodiment, the temperature of the battery cell stack 200 may be artificially raised based on the applied electric signal by containing the heating wire circuit 411 in the sensing assembly 400.

As shown in FIG. 6, the heating wire circuit 411 is contained inside the sensing assembly 400 located at the upper part of the battery cell stack 200, and the upper space of the battery cell stack 200 is generally a space in which a sensing assembly can be located, which utilizes the existing space. In other words, due to the insertion of a separate heating member, it utilizes the space in the width (y-axis direction) direction of the sensing assembly 400 rather than requiring additional space, and therefore, it can be considered as utilizing the existing internal space efficiently. The width (y-axis direction) of the sensing assembly 400 is extended so as to cover the entire upper surface of the battery cell stack 200, so that a method for heating the battery cell stack 20 can be provided without an increase in the height (z-axis direction) of the battery module.

In addition to the space utilization aspects, the existing sensing assembly is utilized, so that additional costs and manufacturing processes can be minimized.

Further, since the heating wire circuit 411 is located inside the battery module, the heat transfer coefficient to the battery cells is relatively good as compared with the case where a separate heating member is disposed outside the battery module. Further, it can be protected from the rigid mono frame 600, and thus can be safe from vibration, shock and the like even without an additional protection member.

Meanwhile, a plurality of battery cells can be stacked along the direction parallel to the main body 410 (y-axis direction) while standing vertically upright to the main body 410 to form the battery cell stack 200. Therefore, the main body 410 can come into contact with each of the battery cells, and the heating wire circuit 411 can pass through the entire upper parts of respective battery cells, so that uniform heat transfer to the battery cells is possible.

If the heating member is located on both sides of the battery cell stack 200, heat is intensively transferred only to the outermost battery cells 211, so that an overall temperature rise of the battery cell stack 200 cannot be achieved.

Further, the respective battery cells may cause a swelling phenomenon that swells mainly in the y-axis direction. This swelling phenomenon is caused by an electrode becoming thicker or a gas generated from the decomposition of an internal electrolyte during the repeated charge/discharge processes. When the heating member is located on both sides of the battery cell stack 200, the function of the heating member may be reduced or damaged due to a strong compression of the swelling. In particular, when the heating member is a heating wire circuit 411 of the heating wire using electric resistance as in the present disclosure, a short circuit or a fire may occur due to insulation breakdown caused by damage to the covering layer.

Meanwhile, referring to FIGS. 3 and 6, the battery module 100 according to the present embodiment may further include a thermal conductive resin layer 800 located on a lower surface of the battery cell stack 200. Further, when one or more battery modules 100 configures a battery pack, a heat sink may be located at a lower end of the battery module 100.

The thermal conductive resin layer 800 may include a thermal conductive resin, and in particular, may include a thermal conductive adhesive material. For example, it may include at least one of a silicone-based material, a urethane-based material, and an acrylic-based material, and in particular, it is preferable to include a urethane-based material.

The thermal conductive resin is a material having excellent thermal conductivity, and the heat generated in the battery cells may be discharged to the outside through the thermal conductive resin layer 800 and the heat sink. The thermal conductive resin layer 800 can be seen as a kind of cooling device. However, the thermal conductive resin includes a thermal conductive adhesive material, and is a liquid when coating, but may be a material that solidifies after the battery cell stack 200 is stacked thereon. Therefore, the thermal conductive resin layer 800 may fix the battery cell stack 200 in the battery module 100. That is, the thermal conductive resin layer 800 in the present embodiment not only improves heat dissipation characteristics for the battery cell stack 200, but also has an effect of effectively fixing the battery cell stack 200.

In the present embodiment, the sensing assembly 400 containing the heating wire circuit 411 may be located opposite to the thermal conductive resin layer 800, with the battery cell stack 200 being interposed therebetween. Since the sensing assembly 400 and the thermal conductive resin layer 800 are separated from each other at a certain distance, it is possible to prevent the problem that the heat transferred through the heating wire circuit 411 is not transferred to the battery cells, but is discharged to the outside through the thermal conductive resin layer 800 and the heat sink. That is, the heat wire circuit 411 according to the present disclosure can minimize a heat loss due to a cooling system member such as the thermal conductive resin layer 800. Depending on the external temperature environment of the battery module, the heating wire circuit 411 and the thermal conductive resin layer 800 can effectively perform their respective heating and cooling functions without interfering from each other.

Hereinafter, a modified embodiment of the present disclosure will be described with reference to FIG. 7.

Figure 7:
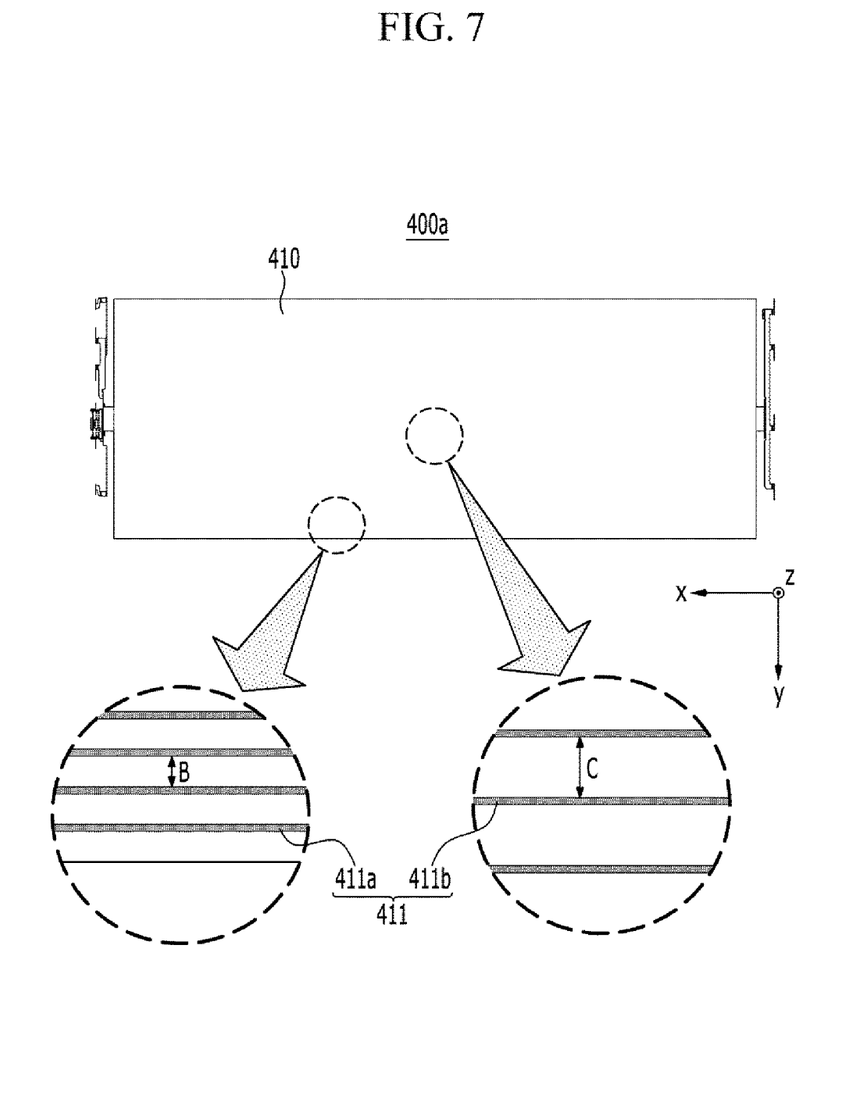
FIG. 7 is a plan view of a sensing assembly according to a modified embodiment of the present disclosure as viewed from above.

FIG. 7 is a plan view of a sensing assembly 400a according to a modified embodiment of the present disclosure as viewed from above.

Referring to FIG. 7 together with FIGS. 3 and 6, the battery cell 211 located on the outermost side among the battery cells comes into contact with the sidewall of the mono frame 600, and thus is more affected by the external environment than the battery cell 212 located on the inner side. Therefore, when exposed to a low temperature environment, the temperature of the battery cells 211 located at the outermost side becomes the lowest, which induces a temperature deviation between the battery cells. When the temperature deviation between the battery cells 210 is deepened, it may be the cause of lowering the life of the battery module 100 itself.

Therefore, according to the present embodiment, the interval B between the heating wire circuits 411*a* passing through the upper part of the battery cells 211 located at the outermost side of the battery cell stack 200 may be narrower than the interval C between the heating wire circuits 411*b* passing through the upper part of the other battery cells 212.

Due to the difference in the interval as described above, the heating wire circuit 411 is configured in which the length of the portion passing through the upper part of the battery cell 211 located on the outermost side of the battery cell stack 200 may be longer than the length of the portion passing through the upper part of the other battery cells 212.

In addition, in order to form a continuous heating gradient, the interval between the heating wire circuits 411 may be narrowed toward the outside from the center of the battery cell stack 200.

This is for eliminating the temperature deviation between the battery cells 210 described above, the interval and length of the heating wire circuit 411 can be adjusted differently for each portion to transfer more heat to the battery cell 211 located at the outermost side. The heating wire circuit 411 in the present disclosure can pass through the upper part of each battery cell 210 and transfer heat to all of the battery cells 210, and additionally, eliminate the temperature deviation between the battery cells 210 and thus contribute to the improvement of the uniform performance and life of the battery module.

Figure 8:
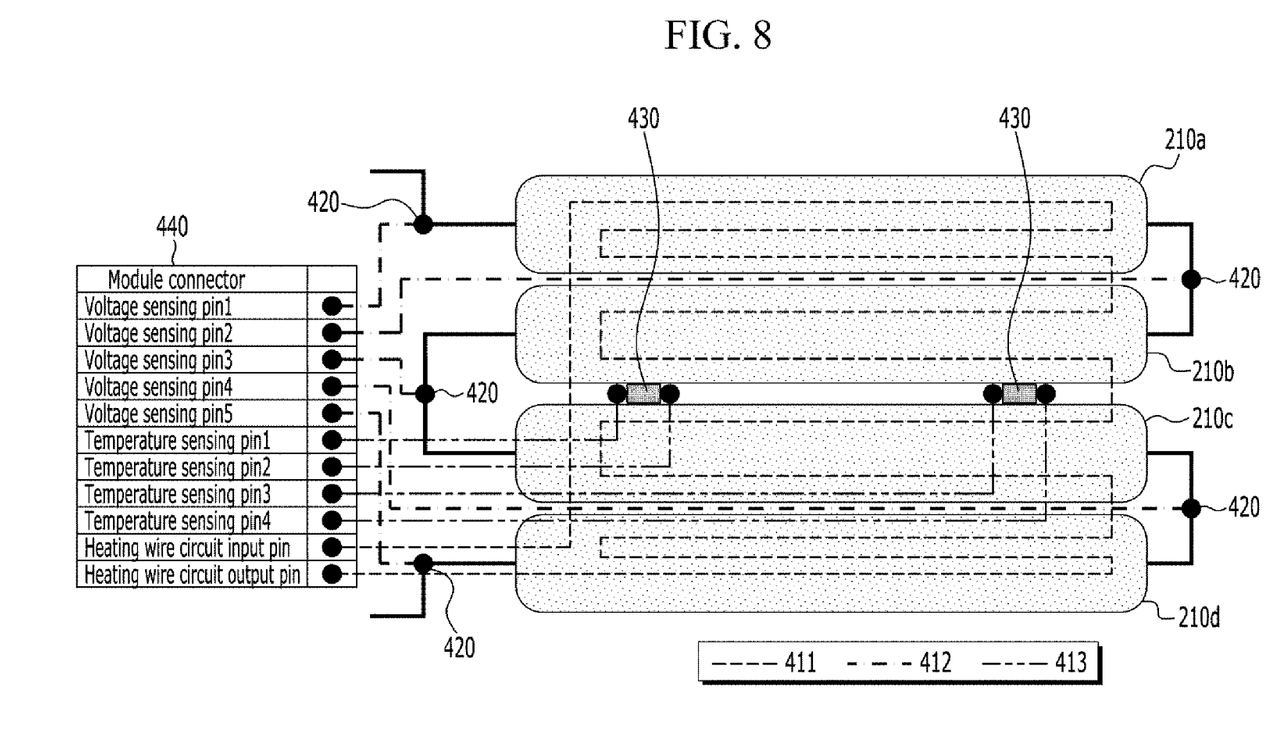
FIG. 8 is a schematic diagram showing a battery cell, a heating wire circuit, a voltage sensing circuit, and a temperature sensing circuit.

FIG. 8 is a schematic diagram showing a battery cell, a heating wire circuit 411, a voltage sensing circuit 412, and a temperature sensing circuit 413.

Referring to FIG. 8, in the embodiment of the present disclosure, a plurality of battery cells are provided. For convenience of explanation, four battery cells 210*a*, 210*b*, 210*c*, and 210*d* are shown. The four battery cells 210*a*, 210*b*, 210*c*, and 210*d* are connected in series, but this is an exemplary connection method between battery cells, and a parallel connection or a series/parallel connection is also possible.

As described above, a heating wire circuit 411 passing through each upper part of the battery cells 210*a*, 210*b*, 210*c*, and 210*d* may be provided. Moreover, the interval between the heating wire circuits 411 passing through the upper part of the battery cells 210*a* and 210*d* located on the outermost side may be narrower than the interval between the heating wire circuits 411 passing through the upper part of the other battery cells 210*b* and 210*c*.

Further, the heating wire circuit 411 is configured in which the length of the portion passing through the upper part of the battery cells 210*a* and 210*d* located on the outermost side may be longer than the length of the portion passing through the upper part of the other battery cells 210*b* and 210*c*.

Further, as described above, the sensing assembly of the present disclosure includes a module connector 440 connected to the main body of the sensing assembly.

The module connector 440 may include a heating wire circuit input pin and a heating wire circuit output pin each connected to the heating wire circuit 411. An external electrical signal can be applied through the heat wire circuit input pin and the heat wire circuit output pin to heat the heat wire circuit 411. However, FIG. 8 shows, for example, an input pin and an output pin for one heating wire circuit 411, and each time a line of the heating wire circuit 411 is added one by one, an input pin and an output pin corresponding thereto may be included in the module connector 440.

Meanwhile, the main body according to the present embodiment may further include a voltage sensing circuit 412 and a temperature sensing circuit 413 in addition to the heating wire circuit 411. As described above, since the heating wire circuit 411 is added to the sensing assembly that senses the voltage and temperature of the battery cells, the main body of the sensing assembly may further include a voltage sensing circuit 412 and a temperature sensing circuit 413, in addition to the heating wire circuit.

The voltage sensing circuit 412 is connected to the voltage sensing unit 420 in contact with the electrode terminals of the respective battery cells 210*a*, 210*b*, 210*c*, and 210*d*, so that the voltage measurement values of the battery cells 210*a*, 210*b*, 210*c* and 210*d* can be transmitted as electrical information to BMS (battery management system) via a module connector 440.

The temperature sensing circuit 413 is connected to a thermistor 430 located between respective battery cells 210*a*, 210*b*, 210*c*, and 210*d*, so that the temperature values of the battery cells 210*a*, 210*b*, 210*c*, and 210*d* can be transmitted as electrical information to BMS (battery management system) via the module connector 440.

The voltage sensing circuit 412 and the temperature sensing circuit 413 may be connected to a voltage sensing pin and a temperature sensing pin of the module connector 440, respectively.

That is, the sensing assembly in the present disclosure includes a heating wire circuit 411, a voltage sensing circuit 412, and a temperature sensing circuit 413, and it can not only measure the voltage and temperature of the battery cell, but also perform the heating function without any additional member.

Meanwhile, since the sensing assembly in the present disclosure includes a flexible printed circuit (FPC) or a flexible flat cable (FFC), the heating wire circuit 411, the voltage sensing circuit 412, and the temperature sensing circuit 413 are inserted inside the cable, and it is easy to cope with external shock. That is, although the heating wire circuit 411 is illustrated in FIG. 5 or FIG. 7 for convenience of description, it may be a shape of being inserted into a cable.

Meanwhile, the battery module according to the present embodiments may include a module frame for housing the battery cell stack, and the main body of the sensing assembly may be located between the upper surface of the battery cell stack and the module frame.

The module frame may be a mono frame 600 as shown in FIG. 3, or a U-shaped frame described with reference to FIG. 9 below.

Once again referring to FIG. 3, the mono frame 600 may be a metal frame having an opened front surface (x-axis direction) and an opened rear surface (direction opposite to the x-axis). The battery cell stack 200 is housed through the opened front surface or the opened rear surface, and a cover plate 500 may be disposed to protect the sensing assembly 400 during the housing process.

Figure 9:
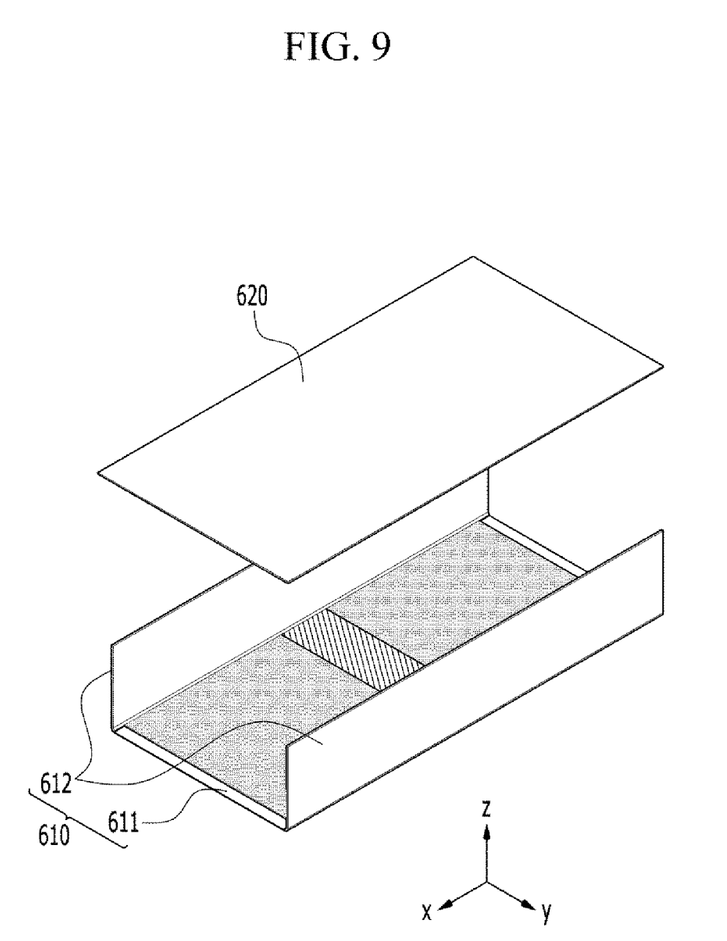
FIG. 9 is a view showing a U-shaped frame and an upper plate.

FIG. 9 is a view showing a U-shaped frame 610 and an upper plate 620.

Referring to FIG. 9, the module frame may include a U-shaped frame 610 and an upper plate 620.

The U-shaped frame 610 may have a structure in which the front surface (x-axis direction), the rear surface (direction opposite to the x-axis) and the upper surface (z-axis direction) are opened, and it is provided with the bottom part 611 and both side parts 612 extending in the upper direction (Z-axis direction) from opposite ends of the bottom part 611.

The upper plate 620 is connected to the opened upper surface of the U-shaped frame 610, and the opened front and rear surfaces of the U-shaped frame 610 may be respectively connected to the end plate 700 in FIG. 3. The U-shaped frame 610 may be joined to the upper plate 620 by welding. It is preferable that the U-shaped frame 610 and the upper plate 620 are metal plates having a predetermined strength.

A thermal conductive resin can be coated onto the bottom part 611 of the U-shaped frame 610 to form a thermal conductive resin layer, and then the battery cell stack and the sensing assembly may be housed thereon. Next, the upper plate 620 may be joined to the opened upper surface of the U-shaped frame 610. By the assembly procedure as described above, the U-shaped frame 610 can eliminate the cover plate 500 as shown in FIG. 3.

One or more battery modules according to the present embodiment described above may be mounted together with various control and protection systems such as a battery management system (BMS) and a cooling system to form a battery pack.

The battery module or the battery pack including the battery module may be applied to various devices. These devices may be applied to transportation means such as an electric bicycle, an electric vehicle, a hybrid vehicle, but the present disclosure is not limited thereto and can be applied to various devices that can use the secondary battery.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: battery module
200: battery cell stack
210: battery cell
300: busbar
310: first busbar frame
320: second busbar frame
400: sensing assembly
410: main body
411: heating wire circuit
420: voltage sensing unit
430: thermistor
440: modular connector

The invention claimed is:

1. A battery module comprising:
a battery cell stack in which a plurality of battery cells are stacked; and
a sensing assembly located on the battery cell stack,
wherein the sensing assembly includes a main body located on the battery cell stack and a module connector connected to the main body,
wherein the main body is a flexible printed circuit (FPC) or a flexible flat cable (FFC), and
wherein the main body includes a includes a voltage sensing circuit, a temperature sensing circuit, and heating wire circuit,
wherein the temperature sensing circuit and the heating wire circuit are separate circuits, and
wherein the heating wire circuit comprises a plurality of wire segments spaced apart from one another, the wire segments in a first region being spaced closer together than the wire segments in a second region, the first region being located closer to an outermost battery cell of the battery cell stack than the second region.

2. The battery module as set forth in claim 1,
wherein the main body covers an entire upper surface of the battery cell stack.

3. The battery module as set forth in claim 1,
wherein the heating wire circuit passes through an upper part of each of the plurality of battery cells.

4. The battery module as set forth in claim 3,
wherein a portion of the heating wire circuit passing through an upper part of a first one of the battery cells is longer than a second length of a portion passing through an upper part of an other battery cell.

5. The battery module as set forth in claim 1,
wherein the plurality of battery cells are stacked along a direction parallel to the main body while each of the battery cells extends orthogonally to a plane defined by the main body.

6. The battery module as set forth in claim 1,
wherein the wire segments progressively become more closely spaced apart from a central region of the battery cell stack towards the outermost battery cell of the battery cell stack.

7. The battery module as set forth in claim 1,
wherein the module connector includes a heating wire circuit input pin and a heating wire circuit output pin each connected to the heating wire circuit.

8. The battery module as set forth in claim 1,
further comprising a thermal conductive resin layer located on a lower surface of the battery cell stack.

9. The battery module as set forth in claim 1,
further comprising a module frame that houses the battery cell stack therein,
wherein the main body is located between an outer surface of the battery cell stack and the module frame.

10. A battery pack comprising one or more battery modules as set forth in claim 1.

11. The battery module as set forth in claim 1,
further comprising a thermal conductive resin layer located along a first outer surface of the battery cell stack, wherein the main body of the sensing assembly extends along a second outer surface of the battery cell stack, the second outer surface being on an opposite side of the battery cell stack from the first outer surface.

12. A battery module comprising:
a battery cell stack in which a plurality of battery cells are stacked; and
a sensing assembly located on the battery cell stack,
wherein the sensing assembly includes a main body located on the battery cell stack and a module connector connected to the main body,
wherein the main body is a flexible printed circuit (FPC) or a flexible flat cable (FFC), and
wherein the main body includes a includes a voltage sensing circuit, a temperature sensing circuit, and heating wire circuit,
wherein the temperature sensing circuit and the heating wire circuit are separate circuits,
wherein the main body covers an entire upper surface of the battery cell stack and contacts each of the battery cells, wherein the heating wire circuit passes through an entire upper part of each of the plurality of battery cells, and wherein the plurality of battery cells are stacked along a direction parallel to the main body while each of the battery cells extends orthogonally to a plane defined by the main body.

13. The battery module as set forth in claim 12, wherein the heating wire circuit comprises a plurality of wire segments spaced apart from one another, the wire segments in a first region being spaced closer together than the wire segments in a second region, the first region being located closer to an outermost battery cell of the battery cell stack than the second region.

14. The battery module as set forth in claim 12, wherein a portion of the heating wire circuit passing through an upper part of a first one of the battery cells is longer than a second length of a portion passing through an upper part of another battery cell.

15. The battery module as set forth in claim 13, wherein the wire segments progressively become more closely spaced apart from a central region of the battery cell stack towards the outermost battery cell of the battery cell stack.

16. The battery module as set forth in claim 12, wherein the module connector includes a heating wire circuit input pin and a heating wire circuit output pin each connected to the heating wire circuit.

17. The battery module as set forth in claim 12, further comprising a thermal conductive resin layer located on a lower surface of the battery cell stack.

18. The battery module as set forth in claim 12, further comprising a module frame that houses the battery cell stack therein, wherein the main body is located between an outer surface of the battery cell stack and the module frame.

19. A battery pack comprising one or more battery modules as set forth in claim 12.

20. The battery module as set forth in claim 12, further comprising a thermal conductive resin layer located along a first outer surface of the battery cell stack, wherein the main body of the sensing assembly extends along a second outer surface of the battery cell stack, the second outer surface being on an opposite side of the battery cell stack from the first outer surface.

* * * * *